United States Patent [19]

George et al.

[11] Patent Number: 5,141,979
[45] Date of Patent: Aug. 25, 1992

[54] MELT STABILIZED POLYKETONE BLEND CONTAINING A TITANIUM ALKOXIDE COMPOUND

[75] Inventors: Eric R. George; Hoe H. Chuah, both of Houston, Tex.

[73] Assignee: Shell Oil Company, Houston, Tex.

[21] Appl. No.: 782,186

[22] Filed: Oct. 24, 1991

[51] Int. Cl.$^5$ ............................................... C08K 5/09
[52] U.S. Cl. ..................................... 524/398; 524/417
[58] Field of Search ................................. 524/398, 417

[56] References Cited

U.S. PATENT DOCUMENTS

| 4,761,448 | 8/1988 | Kluttz et al. | 524/381 |
| 4,843,144 | 7/1989 | Van Broekhoven et al. | 528/392 |
| 5,021,496 | 6/1991 | Machado et al. | 524/417 |

OTHER PUBLICATIONS

A. Fradet and E. Marechal, Kinetics and Mechanisms of Polyesterifications, "Reactions of Diols With Diacids", Advances in Polymer Science 43 pp. 83–87 (1982).

*Primary Examiner*—Kriellion S. Morgan
*Assistant Examiner*—Tae H. Yoon
*Attorney, Agent, or Firm*—James O. Okorafor

[57] ABSTRACT

A stabilized polymer composition comprising a linear alternating polymer of carbon monoxide and at least one ethylenically unsaturated hydrocarbon, at least one melt stabilizing agent selected from the group consisting of titanium alkoxides. A process of preparing the composition and articles of manufacture produced from the composition are also disclosed.

15 Claims, No Drawings

MELT STABILIZED POLYKETONE BLEND CONTAINING A TITANIUM ALKOXIDE COMPOUND

FIELD OF THE INVENTION

This invention generally relates to polyketone polymers. More particularly, this invention relates to a stabilized polyketone polymer composition comprising the polymer, and at least one melt stabilizing agent.

BACKGROUND OF THE INVENTION

Polyketone polymers are generally known in the art. Of particular interest among polyketone polymers is the class of linear alternating polymers of carbon monoxide and at least one ethylenically unsaturated hydrocarbon. This particular class of polyketone polymers is disclosed and claimed in numerous patents assigned to Shell Oil Company.

The addition of glass fiber and/or mineral fillers to reinforce polyketones is known in the art. Glass fibers, mica, and talc are examples of reinforcing materials or fillers that have been and are still being used.

It is known that these polyketone polymers have stability problems. These stability problems include ultraviolet (UV), melt stability, and heat aging stability. It has been suggested that the melt stability problem is caused by the tendency of the polymer to crosslink, especially at melt processing temperatures. It is known that glass fibers and mineral fillers in spite of their desirability tend to accelerate the crosslinking of the polymer, thereby excarbeting the problem of melt stability.

In spite of the successes that have been achieved towards melt stabilizing polyketones, the ideal melt stabilizing agent is yet to be discovered. Therefore, there continues to be a need and/or search for materials that can effectively melt stabilize polyketones.

Transition metal alkoxides including titanium alkoxides are known. It is equally well known that titanium alkoxide is a catalyst useful in the polymerization of polyesters. Titanium alkoxide catalysts can be used in both the esterification and the polymerization steps. See paper on Kinetics And Mechanisms of Polyesterifications: Reactions of Diols With Diacids, in particular 6.2.1 and 6.2.2. This paper can be found in Advances in Polymer Science (1982) Vol. 42, pp. 53 to 65 and is authored by Alain Fradet and Ernest Marechal. Hereinafter, this reference will be referred to as Alain et al.

It is not known in the art that transition metal alkoxides are useful as melt stabilizers. It is particularly not known that titanium alkoxide has utility as a melt stabilizer for polyketone polymers.

It is a discovery of this invention that the addition of an effective amount of titanium alkoxides to polyketone polymer produces a melt stabilizing effect on the polymer blend during melt processing.

SUMMARY OF THE INVENTION

It is a general object of this invention to provide a melt stabilized polyketone polymer blend.

It is a further object of this invention to provide a melt stabilized polyketone polymer blend having a good overall balance of properties.

In accordance with this invention, it is now provided a melt stabilized polymer blend comprising a major portion of a linear alternating polymer of carbon monoxide and at least one ethylenically unsaturated hydrocarbon and a minor portion of at least one titanium alkoxide in an amount effective to function as melt stabilizers.

In another embodiment of this invention, a titanium alkoxide is used in conjunction with tribasic calcium phosphate.

DETAILED DESCRIPTION OF THE INVENTION

The materials useful in practicing this invention include a linear alternating polymer of carbon monoxide and at least one ethylenically unsaturated hydrocarbon, glass fiber reinforcers, a mineral filler, one or more apatite, such as tribasic calcium phosphate, and at least one transition metal alkoxide such as titanium alkoxides. In general, the practice of this invention involves suitably admixing suitable quantities of the useful materials to form a stabilized polyketone polymer composition.

The resulting polyketone polymer composition has utility as a thermoplastic material for example in the manufacturing and coating of articles. These articles can be shaped articles such as containers for food and drink, and parts of the automotive industry, including sucker rods, gears, and valve covers. These articles are produced by conventional methods exemplified by injection molding, and thermoforming.

THE POLYMER

The polyketone polymers of the invention are of a linear alternating structure and contain substantially one molecule of carbon monoxide for each molecule of unsaturated hydrocarbon. Hereinafter, these polymers may sometimes be simply referred to as polyketones. Suitable ethylenically unsaturated hydrocarbons for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

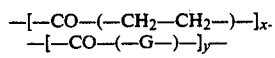

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO—(—CH$_2$CH$_2$—)— units and the —CO—(—G—)— units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of the proportion of the second hydrocarbon present. Typical melting points for the polymers are from about 175° C. to about 300° C., more typically from about 210° C. to about 270° C. The polymer have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144 (Van Broekhoven et al). The carbon monoxide and hydrocarbon monomer(s) are contacted under polymerization conditions in the presence of a catalyst composition formed from a compound of palladium, the anion of a nonhydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]-propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

MELT STABILIZING AGENTS

The melt stabilizing agents useful in the practice of this invention are transition metal alkoxides exemplified by titanium alkoxides, aluminum alkoxides, zirconium alkoxides and antimony butoxide. Titanium alkoxides are preferred. Particularly preferred titanium alkoxides are titanium isopropoxide and titanium butoxide.

These titanium alkoxides can be used alone or in combination with other melt stabilizing agents such as calcium apatite. Calcium apatite also known as tribasic calcium phosphate is a naturally occurring compound. It is more fully disclosed in U.S. Pat. No. 5,021,496 especially at col. 4, lines 1 to 11. For the purpose of providing an enabling disclosure, U.S. Pat. No. 5,021,496 is herein incorporated by reference.

It is known that titanium alkoxides react by forming chelates with compounds such as alpha-hydroxy acids, diacids, and diketones. See Alain et al. It is theorized that its effectiveness in functioning as a melt stabilizer may be in part due to its ability to form chelates with polyketones.

CONVENTIONAL ADDITIVES

Conventional additives including plasticizers, mold release agents, pigments, fillers, and reinforcers may also be added to the blend. Additionally, conventional heat aging stabilizers singularly or collectively (as a package) may also be added to polyketone.

RANGES OF MELT STABILIZERS AND THE PROCESS

The polyketone polymers are stabilized according to the invention by the addition of a suitable or effective amount of the melt stabilizing agents, and conventional additives. The term effective amount of melt stabilizing agents as used herein means that amount of agent or agents that results in a melt stabilizing effect on the polymer blend. This amount will vary with the particular agent or agent(s) used. Generally speaking, this amount will range from about 0.1 to about 1 weight percent for titanium isopropoxide, and from about 0.1 to about 2 weight percent for titanium butoxide. Manipulations within these ranges, so as to achieve the desired result, even when used in combination with other melt stabilizing agents is within the competence of one skilled in the art.

The additives are added to the polymer by conventional methods suitable for forming an intimate mixture of the polymer and the additives. Such methods include dry blending of the polymer and additives in finely divided form followed by compression molding or by extrusion of the mixture. Alternatively, the stabilized composition is formed by blending the components in a mixing device operating at high shear. The composition is then formed into its final shape by a process such as extrusion, injection molding, or thermoforming.

The following examples further illustrate various aspects of the invention.

EXAMPLE 1

Preparation of Polyketone Polymer

A linear alternating terpolymer of carbon monoxide, ethylene, and propylene was produced in the presence of a catalyst composition formed from palladium acetate, trifluoroacetic acid and 1,3-bis[di(2-methoxyphenyl)-phosphine]propane. The terpolymer had a melting point of 220° C. and a limiting viscosity number, measured in m-cresol at 60° C., of 1.80 dl/g.

EXAMPLE 2

Preparation of Samples

Samples were prepared by dry blending pellets of the polyketone polymer of Example I, with titanium butoxide and titanium isopropoxide. These samples were then blended downstream in a corotating twin screw extruder. These samples contained varying amounts of titanium butoxide or isopropoxide. The samples were numbered 2 to 7 and are shown in Table 1.

Additional samples containing varying amount of titanium butoxide or isopropoxide with and without tribasic calcium phosphate were also prepared. These samples were numbered 8 to 10 and are shown in Table 2.

TABLE 1

| Sample No. | | Viscosity (Pa · sec) | | |
|---|---|---|---|---|
| | | 0 Min. | 10 Min. | 28 Min. |
| 1 | 91/054 | 1296 | 2917 | 10540 |
| 2 | 0.1% TiBu | 984 | 2692 | 7199 |
| 3 | 0.5% TiBu | 724 | 1522 | 5247 |
| 4 | 2.0% TiBu | 605 | 2637 | 15400 |
| 5 | 0.1% Ti Iso | 985 | 1817 | 6454 |
| 6 | 1.0% Ti Iso | 434 | 4300 | 24000 |
| 7 | 2.0% Ti Iso | 858 | 46000 | 180000 |

Sample Nos. 2 and 3 of Table 1 illustrate the effectiveness of titanium butoxide in melt stabilizing polyketone polymer. It is particularly significant that at a 0.5 wt % concentration (Sample No. 3) at 28 mins. the rise in melt viscosity is reduced by more than 50%. Sample No. 4 suggests that the effective concentration of titanium butoxide lies between 0.1 to less than 2 wt %.

Sample No. 5 illustrates the effectiveness of titanium isopropoxide as a melt stabilizer for polyketones. Sample Nos. 6 and 7 demonstrate that a critical range exists for this utility, which range lies between 0.1 to less than 1.0 wt %.

The data in Table I shows that while titanium butoxide and titanium isopropoxides can melt stabilize polyketones, their critical or effective ranges differ. Above these ranges, these agents adversely affect melt stability.

TABLE 2

| Sample No. | | 0 Min. | 10 Min. | 28 Min. |
|---|---|---|---|---|
| 8 | 1% ApOh | 995 | 1372 | 3641 |
| 9 | 1.0% TiBu 0.2% ApOH | 727 | 1239 | 4475 |
| 10 | 1.0% TrIso 0.2% ApOH | 473 | 4400 | 25000 |

Sample No. 9 shows that the combined use of titanium butoxide and apatite result in at least an additive effect on melt stability. Compare data for Sample No. 9 to those of Sample Nos. 2 and 8. To the contrary, Sample No. 10 illustrates a worsened adverse effect on melt stability resulting from the combined use of titanium isopropoxide and apatite.

Table 2's data illustrates that the combined generalized usage of melt stabilizers is not desirable. Selectively of agent(s) and amounts as disclosed herein is required to successfully practice this invention.

While this invention has been described in detail for purposes of illustration, it is not to be construed as limited thereby but is intended to cover all changes and modifications within the spirit and scope thereof.

That which is claimed is:

1. A melt stabilized polymer blend comprising:
   (a) a linear alternating polymer of carbon monoxide and at least one ethylenically unsaturated hydrocarbon; and
   (b) at least one titanium alkoxide in an amount effective to function as a melt stabilizer.

2. A composition as in claim 1 wherein said titanium alkoxide is titanium butoxide.

3. A composition as in claim 2 wherein said titanium butoxide is present in an amount within the range of from about 0.1 to less than 2 wt %.

4. A composition as in claim 2 wherein said titanium butoxide is present in an amount of about 1.0 wt %.

5. A composition as in claim 2 wherein said titanium butoxide is present in an amount of about 0.5 wt %.

6. A composition as in claim 3 further comprising tribasic calcium phosphate.

7. A composition as in claim 6 comprising about 1.0 wt % titanium butoxide and about 0.2 wt % tribasic calcium phosphate.

8. A composition as in claim 1 wherein said titanium alkoxide is titanium isopropoxide.

9. A composition as in claim 8 wherein said titanium isopropoxide is present in an amount within the range of from about 0.1 to less than 1 wt %.

10. A composition as in claim 9 wherein said titanium isopropoxide is present in an amount of about 0.5 wt %.

11. A composition as in claim 1 wherein said titanium alkoxide comprises a mixture of titanium butoxide and titanium isopropoxide.

12. A composition as in claim 11 wherein said titanium butoxide is present in an amount of about 0.5 wt % and said titanium isopropoxide is present in an amount of about 0.1 wt %.

13. A process for the preparation of a melt stabilized polymer blend comprising the steps of suitably admixing a major portion of a linear alternating polymer of carbon monoxide and at least one ethylenically unsaturated hydrocarbon and a minor portion of at least one titanium alkoxide compound.

14. A process as in claim 13 wherein said titanium alkoxide compound is selected from the group consisting of titanium butoxide, titanium isopropoxide, or mixtures thereof.

15. A shaped article of manufacture produced from the composition of claim 1.

* * * * *